United States Patent [19]
Martin

[11] 3,793,934
[45] Feb. 26, 1974

[54] AUTOMATIC COFFEE MAKER WITH LIQUID LEVEL SENSOR AND SIPHON CONTROL

[75] Inventor: John C. Martin, Springfield, Ill.

[73] Assignee: Bunn-O-Matic Corporation, Springfield, Ill.

[22] Filed: Dec. 15, 1972

[21] Appl. No.: 315,409

[52] U.S. Cl. .................................. 99/282, 99/304
[51] Int. Cl. .............................................. A23f 1/08
[58] Field of Search ..... 99/280, 281, 282, 283, 295, 99/304, 307, 305

[56] References Cited
UNITED STATES PATENTS

| | | |
|---|---|---|
| 3,220,334 | 11/1965 | Martin .................................. 99/282 |
| 3,354,810 | 11/1967 | Lorang ................................. 99/282 |
| 3,366,034 | 1/1968 | Karlen .................................. 99/282 |
| 3,494,276 | 2/1970 | Martin .................................. 99/282 |
| 3,513,767 | 5/1970 | Bloomfield ........................... 99/282 |
| 3,691,933 | 9/1972 | Martin .................................. 99/282 |

Primary Examiner—Robert W. Jenkins
Attorney, Agent, or Firm—Robert R. Lockwood

[57] ABSTRACT

Cold water is supplied to a basin until it reaches a liquid level sensor and then is siphoned from the basin into a hot water tank from which hot water is siphoned for coffee brewing purposes. Various cold water siphon arrangements are provided together with various means for varying the volume of cold water supplied to the basin.

19 Claims, 14 Drawing Figures

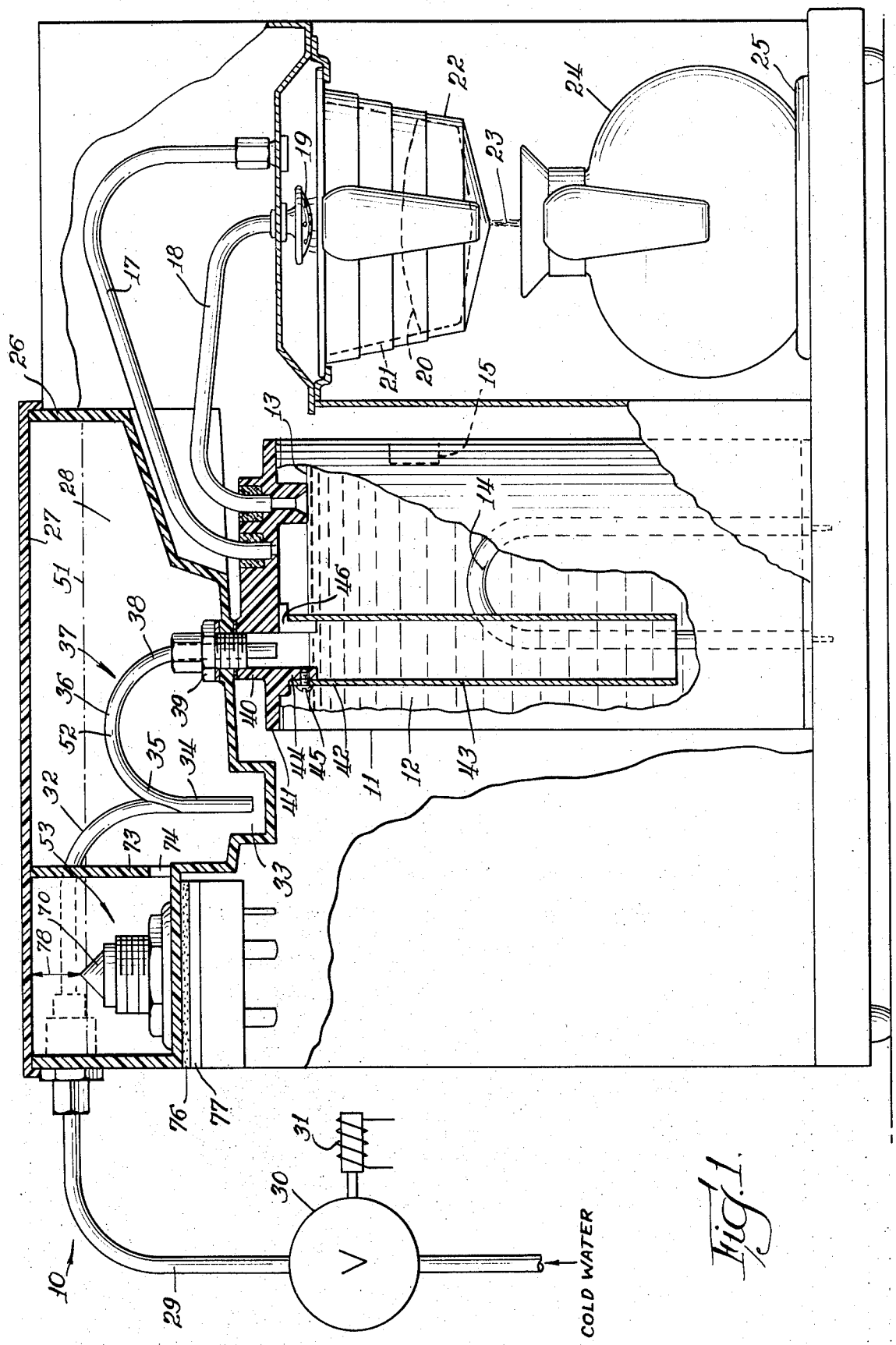

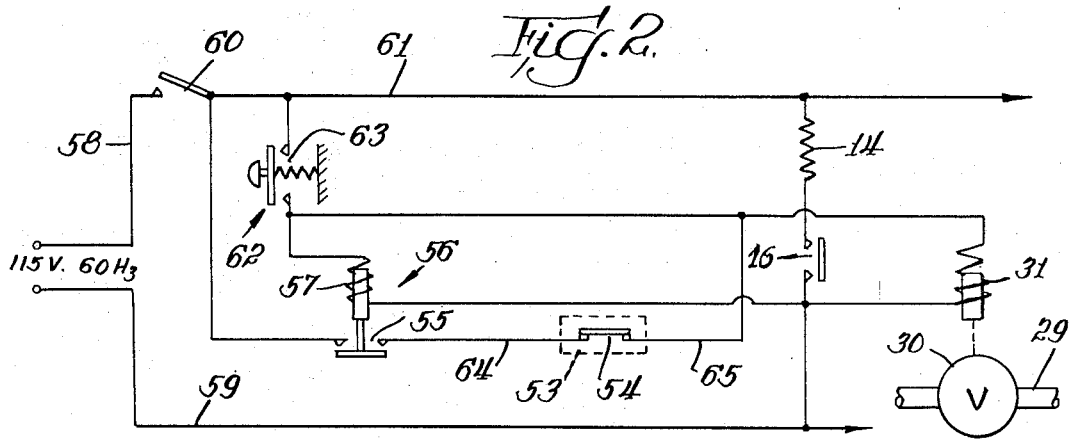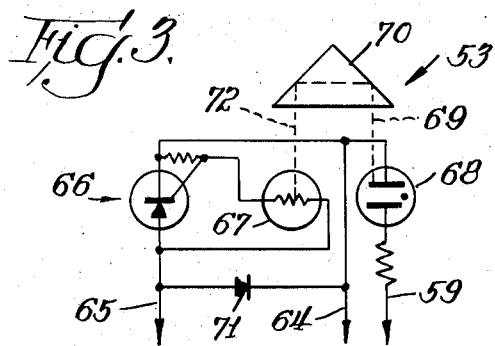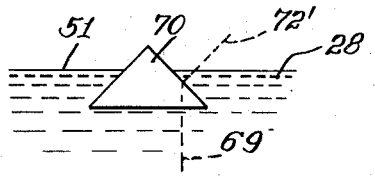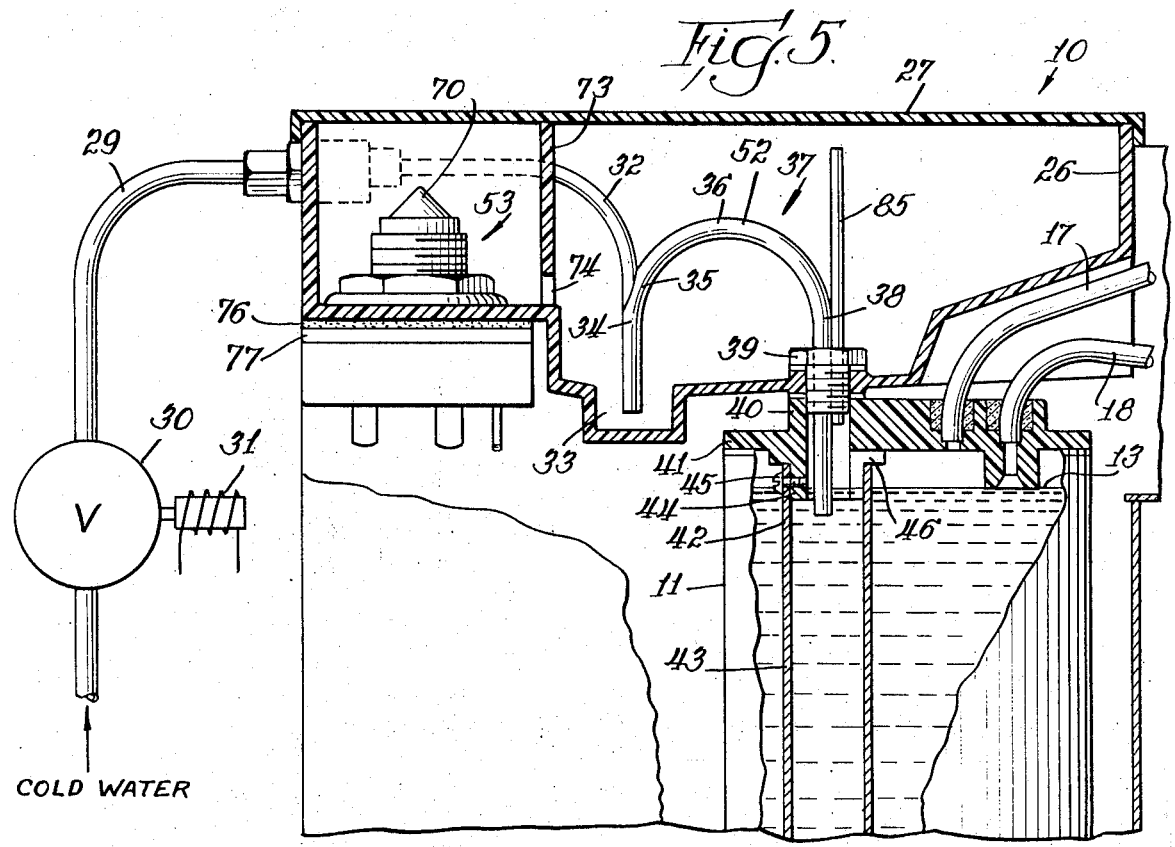

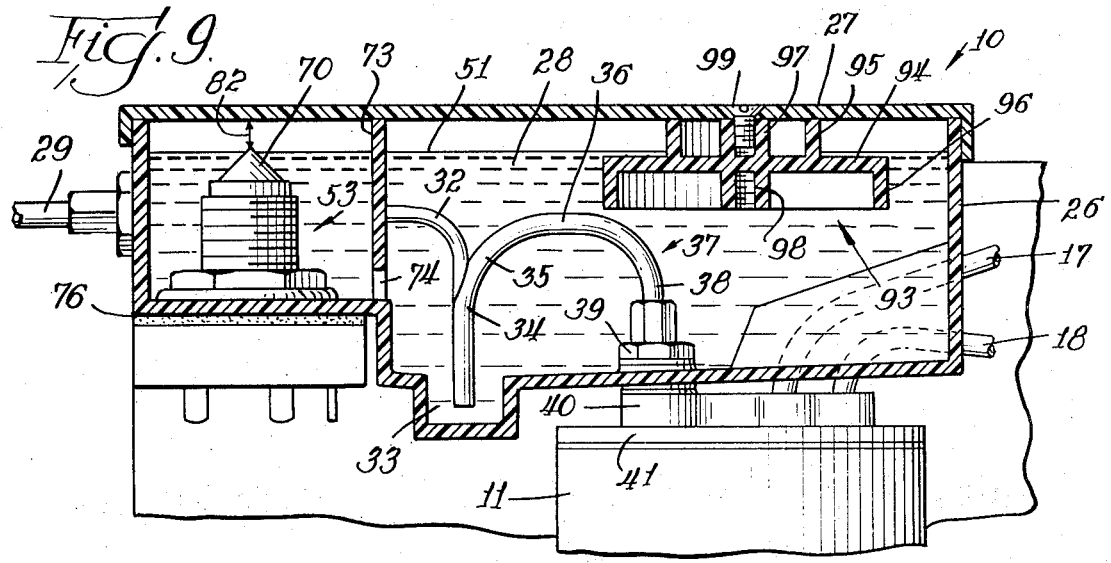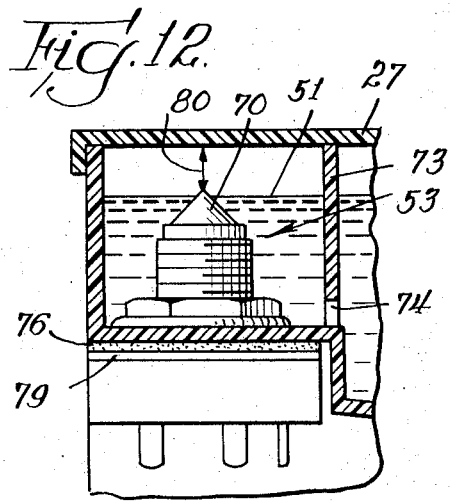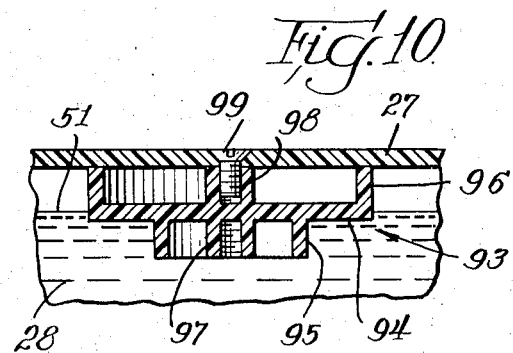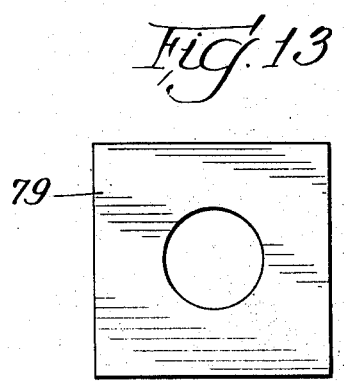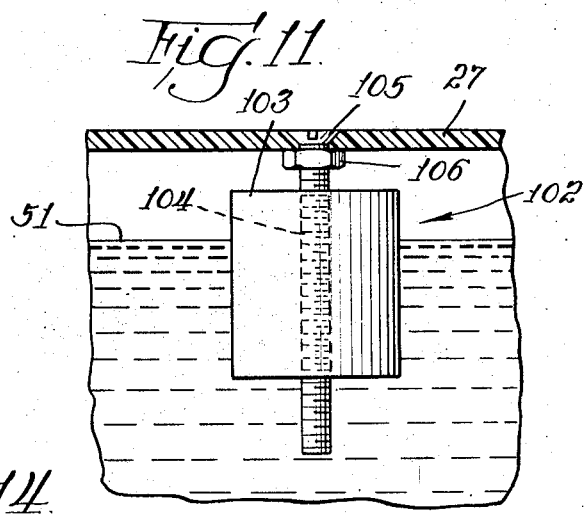

AUTOMATIC COFFEE MAKER WITH LIQUID LEVEL SENSOR AND SIPHON CONTROL

This invention relates to coffee brewing apparatus and constitutes an improvement over the coffee brewer disclosed in Martin U.S. Pat. No. 3,691,933, issued Sept. 19, 1972.

The coffee brewer disclosed in the above patent employs a dump valve in the cold water inlet pipe to the hot water tank from the cold water basin. The dump valve is closed by a winding that is energized at the time that a valve is opened to permit the flow of cold water to the basin and is opened by a spring when the water level in the basin reaches a liquid level sensor at which time the flow of cold water to the basin is shut off. While this arrangement is satisfactory, the presence of the dump valve and control therefor cause an undesirable complication and expense in first cost and maintenance.

Accordingly, an important object of this invention is to provide a coffee brewer that does not require a dump valve while retaining the advantages of the system in which it is employed. Other objects are: To provide for siphoning the cold water out of the cold water basin into the hot water tank from which hot water is siphoned for coffee brewing purposes; to start the siphon action from the cold water basin when the water therein reaches a predetermined level sufficient to brew a quantity of coffee extract; to prevent the initiation of the siphon action from the cold water basin as long as cold water continues to flow into it; to vent to the atmosphere the upper end of the cold water inlet pipe; to adjust the vertical position of a liquid level sensor in the cold water basin to vary the volume of cold water supplied thereto and thereby the volume of hot water available for coffee brewing purposes; to extend the cold water inlet pipe for the hot water tank into the cold water basin by an inverted U-shaped upper end portion opening near the bottom of the basin; to provide a sump in the bottom of the basin into which the inverted U-shaped upper end portion opens; to employ a T-shaped connection or a Y-shaped connection between the inlet water line and the inverted U-shaped upper end portion of the cold water inlet pipe; to vent the upper end of the cold water inlet at the upper end of the hot water tank to the atmosphere to prevent siphoning of the hot water into the cold water basin; to employ a liquid level sensor of the light responsive type for controlling the volume of cold water flowing to the cold water basin; and to provide for adjusting the volume of cold water that is supplied to the cold water basin for each coffee brewing sequence.

In the drawings:

FIG. 1 is a view, partly in side elevation, partly in section and partly diagrammatic of an automatic coffee brewer in which the present invention is embodied.

FIG. 2 shows diagrammatically the circuit connections that are employed in the coffee brewer shown in FIG. 1.

FIG. 3 shows diagrammatically the circuit connections that can be employed for the liquid level sensor.

FIG. 4 shows how the prism of the liquid level sensor functions for bending light rays when contacted by water.

FIG. 5 shows a modified form of the coffee brewer having the vent pipe extending upwardly from the upper end of the cold water inlet pipe.

FIG. 9 shows how volume varying means can be employed in the cold water basin.

FIG. 10 shows an alternate position of the cold water varying means.

FIG. 11 shows a further embodiment of the cold water varying means.

FIG. 12 illustrates how the liquid level sensor can be varied in elevation to change the volume of cold water in the cold water basin.

FIG. 13 is a top plan view of the spacer employed in FIG. 12.

FIG. 14 is a view, in end elevation, of the spacer shown in FIG. 13.

Figure 6:
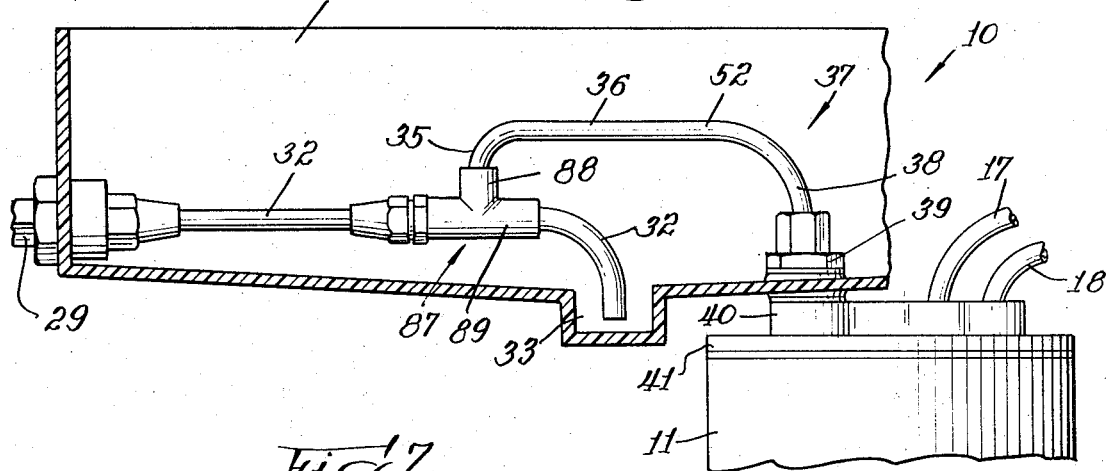
FIG. 6 shows a modified form of the invention employing a T-connection between the cold water inlet pipe and the discharge end of the inlet water line.

In FIG. 1 reference character 10 designates, generally, an automatic coffee brewer embodying this invention. The coffee brewer 10 includes a hot water tank 11 containing water 12 that normally is filled to the level indicated at 13. The water 12 is maintained at the desired temperature by an immersion electric heating element 14 the energization of which is controlled by a thermostat 15. Contacts 16 for the thermostat 15 are illustrated in FIG. 2 to which further reference will be made.

In order to maintain atmospheric pressure at the upper end of the hot water tank 11 a vent tube 17 is employed. Hot water from the tank 11 is siphoned out through a siphon tube 18 to a spray head 19 that overlies ground coffee 20 on a paper filter 21 which is located in a funnel 22. Coffee extract 23 flows from the funnel 22 into a beaker 24 therebelow. The beaker 24 is mounted on a warmer 25 to maintain the coffee extract at the desired temperature.

Positioned above the hot water tank 11 is a cold water basin 26 that is provided with a removable cover 27. A given quantity 28 of cold water flows into the cold water basin 26 in a manner to be described and flows out of it into the hot water tank 11. Cold water from a suitable source under pressure flows through an inlet water line 29 to the cold water basin 26 under the control of a valve 30. A solenoid 31 is arranged to open the valve 30 which is arranged to automatically close when the solenoid 31 is deenergized.

The discharge end 32 of the inlet water line 29 curves downwardly and opens into a sump 33 in the bottom of the cold water basin 26.

Above the lower end of the downwardly curved end 32 of the inlet water line 29 is a Y-connection 34 to one leg 35 of an inverted U-shaped upper end 36 of a cold water inlet pipe that is shown, generally, at 37. This arrangement provides for siphoning cold water from the sump 33 into the hot water tank 11. The other leg 38 of the U-shaped upper end 36 extends through a fitting 39 that projects downwardly through the bottom of the cold water basin 26 and into a threaded boss 40 that extends upwardly from a cover 41 for the hot water tank 11. Cold water from the cold water basin 26 is siphoned by the upper end 36 of the cold water inlet pipe 37 into the upper end 42 of the lower end 43 of the cold water inlet pipe 37 which extends upwardly from the lower portion of the hot water tank 11 to the cover 41. The upper end 42 is telescoped over an apertured boss 44 that depends from the cover 41 and is in alignment with the threaded boss 40. A screw 45 serves to hold the lower end 43 in position on the boss 44.

It will be observed that a slot 46 is formed in the apertured boss 44 to place the upper end of the large diameter lower end 43 of the cold water inlet pipe 37 in communication with the atmosphere through the vent tube 17. The reason for the provision of the slot 46 is to prevent siphoning of the hot water 12 in the tank 11 into the cold water basin 26 while it is being filled from the inlet water line 29.

It is desirable to fill the cold water basin 26 to the level 51 which is above the bight 52 of the inverted U-shaped upper end 36. For this purpose there is employed a liquid level sensor that is indicated, generally, at 53. In FIG. 2 the liquid level sensor 53 is represented by normally closed contacts 54 which are in series with normally open contacts 55 of a relay that is indicated, generally, at 56 and employs a winding 57. The system shown in FIG. 2 is energized over conductors 58 and 59 that are connected to a suitable 115V. 60Hz. source, for example. A main switch 60, when closed, connects the system for energization to the source. When the main switch 60 is closed a conductor 61 is connected directly for energization to the conductor 58. There is provided a manually operable start switch 62 having normally open contacts 63. The start switch 62 is operated to start the brewing cycle. On closure of contacts 63 an obvious energizing circuit is completed for solenoid 31 to open valve 30 and permit cold water to flow from the inlet water line 29 into the cold water basin 26. Winding 57 also is energized to close contacts 55 and provide a holding circuit for winding 57 and solenoid 31 through the normally closed contacts 54 of the liquid level sensor 53.

FIG. 3 illustrates the circuit details of the liquid level sensor 53 which may be employed to respond to the level 51 of the cold water 28 in the cold water basin 26 to effect closure of the valve 30 by deenergizing solenoid 31. This circuit includes an SCR 66 the conductivity of which is controlled by a light responsive device 67 from a light source 68 which may be a neon lamp. Light rays, indicated by a broken line 69, are reflected by a prism 70 and are applied to the light responsive device 67. Under these conditions the SCR 66 conducts half cycles of the alternating current to maintain and energize the winding 57 and the solenoid 31. A diode 71 is connected across conductors 64 and 65 to reduce chatter of the contacts 55 of the relay 56.

In operation the tank 11 normally is filled with hot water 12 to the level indicated at 13. The funnel 22 is charged with ground coffee 20 and placed in operative position under the spray head 19. After closure of main switch 60 the start switch 62 is depressed to energize solenoid 31 and winding 57 of the relay 56. The holding circuit through contacts 55 is completed, valve 30 is opened and cold water flows into the sump 33 until it reaches the level 51 at which time the cold water impinges on the prism 70. When this occurs, as illustrated in FIG. 4, the light rays, instead of being reflected unto the light responsive device 67 are refracted as indicated at 72'. The SCR 66 ceases to conduct and in effect opens normally closed contacts 54. Solenoid 31 is deenergized. Also winding 57 is deenergized and contacts 55 are opened.

It will be observed that the level 51 in the cold water basin 26 is above the bight 52 of the inverted U-shaped upper end 36 of the cold water inlet pipe 37. On cessation of flow of cold water through the inlet water line 29, the inverted U-shaped upper end 36 is filled with water and starts a siphon action which transfers the cold water 28 to the lower end of the hot water tank 11 through the cold water inlet pipe 37. The hot water tank 11 then is completely filled and hot water starts to siphon out of it through the siphon tube 18 when the level of the hot water in it rises above its highest elevation. There are then two siphon actions, the first is from the cold water basin 26 into the hot water tank 11 while the second is from the hot water tank 11 to the spray head 19 for spraying hot water over the ground coffee 20 on the filter 21 in the funnel 22 to brew the coffee extract 23. In FIG. 1 it will be observed that a baffle or enclosure 73 surrounds the upper portion of the liquid level sensor 53. An inlet opening 74 permits flow of cold water into the vicinity of the prism 70. However, the prism 70 is protected against variations in the level of the cold water 28 so that a true level 51 is represented in the baffle or enclosure 73 so that the quantity of cold water 28 in the cold water basin 26 can be accurately predetermined for each successive brewing operation.

In FIG. 1 it will be observed that a suitable gasket 76 is employed for making a water tight connection to the liquid level sensor 53. Below it there is provided a spacer 77 that is relatively thick so that the upper end of the prism 70 is located at a maximum distance indicated at 78 from the cover 27. It will be understood that the prism 70, when the spacer 77 is employed, is located at its lowest elevation in the cold water basin 26 with the result that the liquid level 51 is at its lowest elevation. For example, using the relatively thick spacer 77 the quantity of cold water 28 flowing into the cold water basin 26 may be 60 ounces.

In FIG. 12 a thinner spacer 79 is employed with the result that the upper end of the prism 70 is located at an intermediate distance 80 from the cover 27 and the quantity of cold water flowing into the cold water basin 26 may be 62 ounces. FIGS. 13 and 14 show the details of the spacer 79.

In FIG. 9 no spacer is employed with the result that there is a minimum distance 82 between the upper end of the prism 70 and the under side of the cover 27. This may correspond to a quantity of 64 ounces of cold water that are permitted to flow into the cold water basin 26 before the valve 30 is closed by deenergization of the solenoid 31.

The coffee brewer 10, illustrated in FIG. 5, is similar to that illustrated in FIG. 1 and described hereinbefore except for the provision of a vent pipe 85 extending through the fitting 39 along side of the other leg 38 of the inverted U-shaped upper end 36 of the cold water inlet pipe 37. This provides a vent to the atmosphere and can be employed in lieu of the vent tube 17.

FIG. 6 shows a modification of the interconnection between the inverted U-shaped upper end portion 36 of the cold water inlet pipe 37 and the inlet water line 29. As shown here a T-connection 87 is used with the leg 35 connected to the stem of the T-shape while the crossbar 89 is connected into the inlet water line 29.

Figure 7:
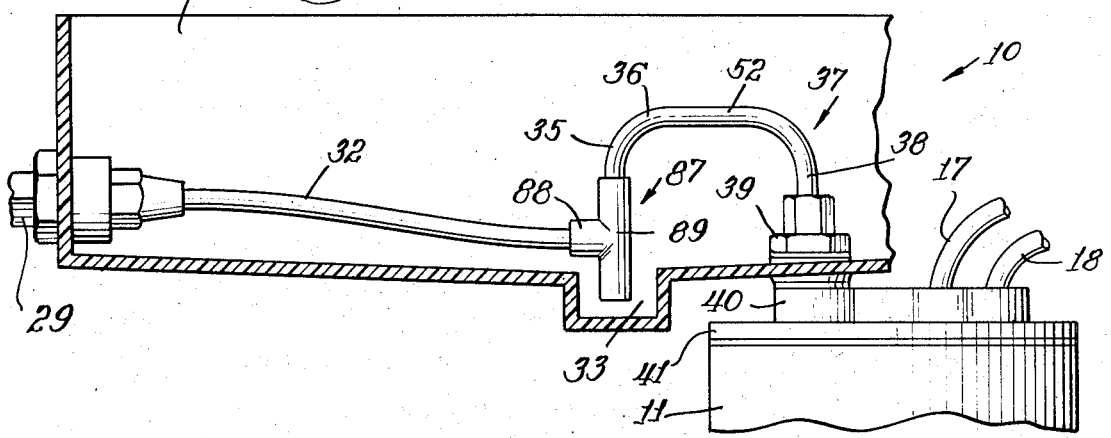
FIG. 7 shows a further modification of the arrangement illustrated in FIG. 6.

FIG. 7 shows still another arrangement of the interconnection between the inverted U-shaped upper end 36 and the discharge end 32 of the inlet water line 29. In this illustration the T-connection is employed. However, the stem 88 of the T-shape is connected to the discharge end 32 while the leg 35 is connected to one end of the bar portion of the T-shape while the other end projects into the sump 33.

Figure 8:
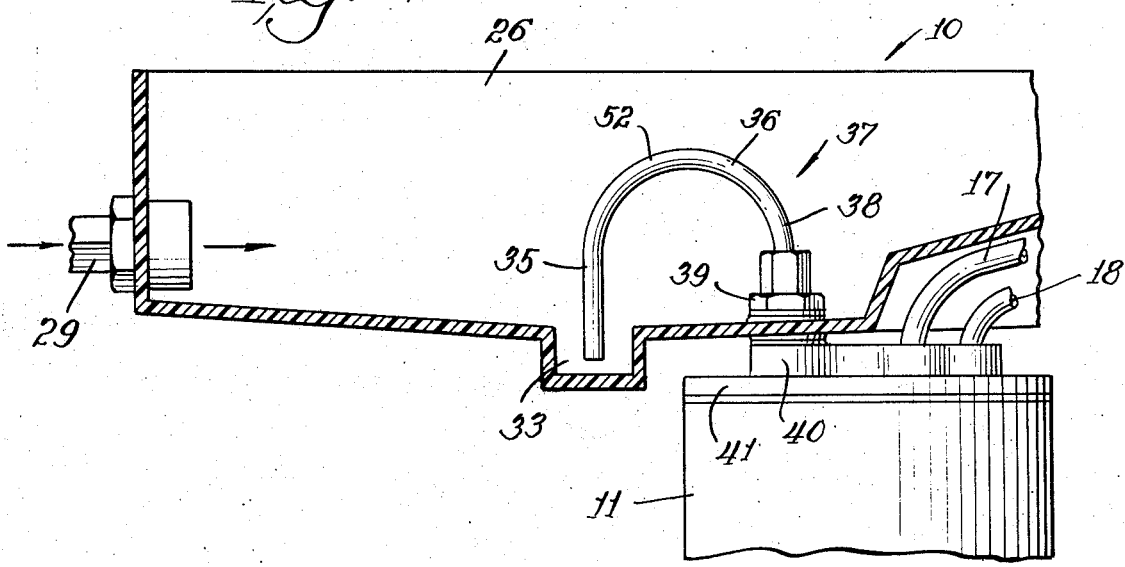
FIG. 8 shows a still further modification of the arrangement as shown in FIG. 6.

In FIG. 8 the discharge end 32 of the inlet water line 29 stops at the wall of the cold water basin 26. There is no direct interconnection between the inverted U-shaped upper end 36 of the cold water inlet pipe 37 and the inlet water line 29. The arrangement illustrated in FIG. 8 is satisfactory where the flow of incoming cold water from the inlet water line 29 is sufficiently rapid to reach the desired elevation in the cold water basis 26 before the siphon action starts through the cold water inlet pipe 37.

As pointed out hereinbefore the level 51 of the cold water 28 in the cold water basin 26 can be varied for successive coffee brewing operations by varying the elevation of the prism 70 of the liquid level sensor 53. Another and preferred manner of varying the elevation of the liquid level 51 is to employ the volume varying means illustrated, generally at 93 in FIGS. 9 and 10. The volume varying means 93 comprises a member 94 which may be cylindrical or square and has a relatively small volume varying section 95 on one side and a relatively large volume varying section 96 on the other side. Threaded apertures 97 and 98 are formed on opposite sides for receiving a bolt 99. When the volume varying means 93 is positioned as illustrated in FIG. 9 with the bolt 99 extending through the cover 27 the volume of the cold water 28 required to produce the level 51 may be 62 ounces. When the volume varying means 93 is turned upside down, as illustrated in FIG. 10, the volume is 60 ounces. With the volume varying means 93 omitted the volume of the cold water 28 may be 64 ounces.

FIG. 11 shows volume of varying means at 102 in the form of a solid cylinder 103 that is internally threaded as indicated at 104. A bolt 105 extends through the cover 27 into the cylinder 103 which can be variably positioned as desired to effect a corresponding variation in the level 51 of the cold water 28 and thereby in its volume. A lock nut 106 is employed to hold the bolt 105 against turning.

I claim:

1. Coffee brewing apparatus comprising a hot water tank, means for heating water in said tank, a siphon tube for withdrawing hot water from said tank to brew coffee extract, means for placing said tank in communication with the atmosphere, a cold water basin above said tank, a cold water inlet pipe extending upwardly through said tank into said basin including an inverted U-shaped upper end portion having its opening near the bottom of said basin, an inlet water line for supplying cold water to said basin from a source under pressure, a valve in said inlet water line, means for opening said valve to cause cold water to flow into said basin, and means for closing said valve when said cold water reaches a predetermined level in said basin above said inverted U-shaped upper end portion whereupon said cold water is siphoned from said basin into said tank until the level of said cold water in said basin is lowered to said downwardly facing opening of said inverted U-shaped upper end portion and hot water is siphoned from said tank through said siphon tube.

2. Coffee brewing apparatus according to claim 1 wherein said basin has a sump in the bottom and said opening to said U-shaped upper end portion faces downwardly in said sump.

3. Coffee brewing apparatus according to claim 1 wherein said inlet water line opens into the leg of said inverted U-shaped end portion above said opening near the bottom of said basin.

4. Coffee brewing apparatus according to claim 3 wherein T-shaped means interconnects said inlet water line and said inverted U-shaped end portion.

5. Coffee brewing apparatus according to claim 3 wherein Y-shaped means interconnects said inlet water line and said inverted U-shaped end portion.

6. Coffee brewing apparatus according to claim 1 wherein the bight of said inverted U-shaped upper end portion is positioned below and adjacent said predetermined level of cold water in said basin.

7. Coffee brewing apparatus according to claim 1 wherein said means for closing said valve includes a liquid level sensor.

8. Coffee brewing apparatus according to claim 7 wherein said liquid level sensor includes normally closed switch means controlled by a light responsive device, a light source and a prism for directing rays from said light source to said light responsive device as long as said prism is not contacted by water in said basin.

9. Coffee brewing apparatus according to claim 1 wherein an air vent line opens into said cold water inlet pipe at the upper end of said hot water tank.

10. Coffee brewing apparatus according to claim 1 wherein means are provided for varying the volume of cold water in said cold water basin required to reach said predetermined level therein for closing said valve.

11. Coffee brewing apparatus according to claim 10 wherein said volume varying means comprises a member having different volume varying sections on opposite sides, and means for securing said member in fixed position in said basin at said predetermined level with one side or the other uppermost.

12. Coffee brewing apparatus according to claim 11 wherein a cover overlies said basin, a said member is detachably mounted in depending relation thereon.

13. Coffee brewing apparatus according to claim 10 wherein said volume varying means comprises a liquid displacing member, and means for variably vertically positioning the same relative to said predetermined level in said basin.

14. Coffee brewing apparatus according to claim 10 wherein a cover overlies said basin, and said volume varying means comprises a liquid displacing member, and a screw depending from said cover and threaded into said member.

15. Coffee brewing apparatus according to claim 10 wherein said means for closing said valve when said cold water reaches a predetermined level in said basin includes a liquid level sensor, and said means for varying the volume of cold water required to reach said level includes means for adjusting the vertical position of said liquid level sensor.

16. Coffee brewing apparatus comprising a hot water tank, means for heating water in said tank, a siphon tube for withdrawing hot water from said tank to brew coffee extract, means for placing said tank in communication with the atmosphere, a cold water basin above said tank, a cold water inlet pipe extending upwardly through said tank into said basin including an inverted U-shaped upper end portion having its opening near the bottom of said basin, means for supplying cold water to said basin until it reaches a predetermined level therein whereupon said cold water is siphoned from said basin into said tank until the level of said cold water in said basin is lowered to said downwardly facing opening in said U-shaped upper end portion and hot water is siphoned from said tank through said siphon tube.

17. Coffee brewing apparatus according to claim 16 wherein said basin has a sump in the bottom and said opening in said U-shaped upper end portion faces downwardly in said sump.

18. Coffee brewing apparatus according to claim 16 an air vent line opens into said cold water inlet pipe at the upper end of said hot water tank.

19. Coffee brewing apparatus according to claim 16 wherein an air vent is located at the upper end of the cold water inlet pipe to place the upper end of said hot water tank in communication with the atmosphere and prevent siphoning of the hot water from said tank into said basin.

* * * * *